(12) United States Patent
Agarwal

(10) Patent No.: US 8,489,450 B2
(45) Date of Patent: Jul. 16, 2013

(54) SYSTEMS AND METHODS FOR FACILITATING CUSTOMER ACQUISITION BY BUSINESSES

(75) Inventor: Shwetav Agarwal, Kolkata (IN)

(73) Assignee: RS-Software, Inc., Kolkata (IN)

( * ) Notice: Subject to any disclaimer, the term of this patent is extended or adjusted under 35 U.S.C. 154(b) by 153 days.

(21) Appl. No.: 13/072,678

(22) Filed: Mar. 26, 2011

(65) Prior Publication Data

US 2012/0245990 A1 Sep. 27, 2012

(51) Int. Cl.
*G06Q 30/00* (2012.01)

(52) U.S. Cl.
USPC ............... 705/14.1; 705/14.49; 705/14.53; 705/14.54; 705/14.55; 705/14.58; 705/14.66

(58) Field of Classification Search
USPC .......................................................... 705/14
See application file for complete search history.

(56) References Cited

U.S. PATENT DOCUMENTS

| | | | |
|---|---|---|---|
| 8,175,950 B1 * | 5/2012 | Grebeck et al. ............. | 705/36 R |
| 2004/0193488 A1 | 9/2004 | Khoo et al. | |
| 2008/0162269 A1 | 7/2008 | Gilbert | |
| 2008/0195457 A1 | 8/2008 | Sherman | |
| 2008/0221984 A1 | 9/2008 | Abhyanker | |
| 2008/0275757 A1 * | 11/2008 | Sharma et al. ................. | 705/10 |
| 2009/0222346 A1 | 9/2009 | Greene et al. | |
| 2011/0173055 A1 * | 7/2011 | Ross et al. ................. | 705/14.13 |
| 2011/0238521 A1 * | 9/2011 | Porat et al. .................... | 705/26.3 |
| 2012/0030034 A1 * | 2/2012 | Knapp et al. ............... | 705/14.71 |
| 2012/0166530 A1 * | 6/2012 | Tseng ........................... | 709/204 |
| 2012/0278091 A1 * | 11/2012 | Yaseen et al. ................ | 705/1.1 |

OTHER PUBLICATIONS

Peekaboomobile About Us.
Shopkick About Us Page.

* cited by examiner

*Primary Examiner* — Namrata (Pinky) Boveja
*Assistant Examiner* — Thuy N Nguyen
(74) *Attorney, Agent, or Firm* — Tran & Associates

(57) ABSTRACT

Systems and methods are disclosed for facilitating acquisition of customers for merchants through targeted offers to prospective customers; improving the precision of targeting by Prospect Profiling and Intent Prediction. In certain embodiments, the system supports monetizing sources of data which contribute to Prospect Profiling and Intent Prediction, such as purchase history, third-party SNP data. In other embodiments, a "Customer acquisition fee" serves as the underlying business model for the Service Provider of the Platform. The system provides cost-effective marketing where merchants pay only after conversion of prospect to customer. Customers get higher savings through Opportunity Auctioning amongst merchants with the value of Discount offer as part of Bid.

20 Claims, 10 Drawing Sheets

US 8,489,450 B2

SYSTEMS AND METHODS FOR FACILITATING CUSTOMER ACQUISITION BY BUSINESSES

Traditionally, businesses acquire new customers through advertisements. For example, traditional television and cable content providers derive substantial revenues from advertising. As discussed in United States Application Serial No. 20080167943, advertisers, content creators, and content distributors strive to identify desirable viewers and to identify how many viewers receive content. U.S. Application Serial No. 20080167943 discloses an exemplary advertising auction tool that includes advertising data, detailed auction data such as pricing to bid on an advertisement time slot and desirable viewership characteristics and metrics, and business data for awarding the advertisement time slot and for distributing the advertisement. The auction tool receives near real-time viewership data about a viewer's selection and use of media content and matches the viewership data with the advertising data to identify one or more advertisements as desirable for distribution during the advertisement time slot. The auction tool then establishes a bid price for each of the matched advertisements. These bid prices are then automatically adjusted by the advertising auction tool based upon comparisons of the matched data for each advertisement and based upon the business data for each advertisement. Thereafter, the auction tool awards the advertisement time slot to maximize a contract price for the advertisement time slot.

In the field of telecommunications, mobile devices are increasingly used for more than simple voice and text communication. Mobile devices are now capable of displaying various forms of advertising content including interactive static, animated, and video images, audio files, web/WAP (Wireless Access Protocol) pages, or combinations of these forms. Advertisers provide such advertising content, which typically includes a brand name, such as a name of a particular product, service, and/or company. A growing number of advertisers are also providing advertising content that includes a brand name as well as associated content, such as games, short-form video, animation, or consumer marketing material such as surveys, coupons, or promotions.

One difficulty with advertising on mobile devices is finding ways to make mobile device advertisements appeal to and be receivable to mobile device users. Text messaging can be used to allow the user to opt-in to the advertising content contained in the text message. But text messaging requires that the user pay for the advertisement by consuming valuable transmission minutes from the consumer's mobile telephone plan. Additionally, text messaging is largely text based, with limited graphic capability and supports only one advertising message or campaign at a time. Text messaging also requires significant participation or set-up from the user—going to the message inbox, opening individual messages, and following the prompts of the message to access a web/WAP page. This required set-up also does not appeal to some mobile device users. Furthermore, some displays of mobile device advertisements cannot be changed by the mobile device user which further restricts the amount of advertising content that can be displayed. This lack of control does not appeal to some mobile device users. Some mobile device advertisements require significant set-up before they can be displayed by the mobile device user.

United States Patent Application 20070178889 discloses a mobile phone with program instructions executable to display a single stream of advertising formed from a number of advertising channels, receive a change input for a particular change to the single stream of advertising, and change the single stream of advertising according to the change input.

One issue with mobile advertisement system is that Consumer Data owners such as payment networks/Financial Institutions are unable to utilize the transaction history data due to regulations and privacy law. Social Networking data also face such restrictions due to consumer backlash when privacy issues are ignored. Consumers are sharing more of their information and activities online. There is an increasing willingness to share this information with commercial business if it results in tangible savings. Business approach to usage of such data has oscillated between extremes—either accessing it directly from Service Providers without explicit knowledge of consumer or avoiding such usage entirely. An acceptable solution where consumers can opt-in to provide information in a controlled manner to businesses of their choosing with a clear understanding of the intended usage of the data and the financial benefits thereof has proven elusive.

Correspondingly, a large amount of Consumer data is available from different players. For example, payment networks, FIs, and merchants have purchase history. Social networking platforms have personal information, social behavior and activity data. Location sharing services have real-time information of users current location coupled with activity. These information can be used for creation of targeted offers but an effective mechanism for usage of such data without violation of privacy laws and regulation has proven elusive. A real-time dynamism to address the consumer at the time and location of service demand has also proven elusive.

Further, current advertising campaigns are static and based on consumer segments/demographics. Additionally, each merchant provides offers based on their own business requirements, but existing systems do not ensure that the customer gets the best deal, leading to customer dissatisfaction.

SUMMARY

In one aspect, systems and methods are disclosed to acquire customers for merchants using a mobile device or a browser of a prospective buyer by capturing attributes from the prospective buyer; generating an intent prediction for the prospective buyer based on usage of purchase history data ; locating nearby merchants and filtering merchants with the intent prediction for the prospective buyer; initiating opportunity auctioning within the merchants for the opportunity to send an offer to the prospect; identifying a winning merchant; and dispensing an advertisement or a coupon for the winning merchant on the mobile device or browser.

In another aspect, systems and methods are disclosed to facilitate customer acquisition for businesses. The system can use consumer data (payment history, social networking data) to create a prospect profile and perform predictive analysis to extrapolate prospect profile with contextual data such as geolocation, timing, among others, to predict intent which increases accuracy of targeted offers thus increasing the probability of customer acquisition or prospect conversion. This creates a monetization strategy for Consumer Data owners such as Payments networks/Financial Institutions/Social Networking Platforms when their data contributes to prediction of intent, while ensuring compliance to privacy laws and regulation. The system satisfies consumer need for dynamic, personalized offers. The result is that more attractive offers can be made to consumers through opportunity auctioning between businesses.

Advantages of various embodiments of the above system may include one or more of the following. The system is a Customer Acquisition Enabling Platform that is built around consumer, merchant and Data owners such as Payment Networks/Financial Institutions, among others. The system generates targeted offers that are dynamic, personal, generated in near-real-time and available for immediate redemption/usage. The targeting is done based on prospect profile created from historical purchase history. The system extrapolates real-time location data, time, and indicated preferences/interests to generate the Predicted Intent.

The system allows Data owners such as Payment Networks/FIs/SNPs to utilize transaction history data in a personally non-identifiable manner, thus reducing exposure from regulations and privacy laws. The system enables advertising campaigns to be dynamic and customized to specific consumers NOT segments/demographics. The system allows each merchant to provide offers based on their own business requirements and to ensure that the customer also gets the best deal. As a result, the system supports:

Increasing accuracy of targeted offers
Monetization of consumer data while ensuring compliance to privacy laws and regulation
Satisfying consumer need for dynamic, personalized offers
Providing more attractive offers to consumers The system is also a Customer Retention Platform, as it creates offers for winning loyalty points. The system is additionally a Coupon tracking Platform which tracks coupons through its life-cycle i.e. from generation to redemption or expiry. It provides merchants a measure of the effectiveness of their offers thus allowing them to reconfigure and fine-tune Bidding Rules to create more attractive offers Other advantages of the preferred embodiments may include one or more of the following. The system provides an efficient and accurate method to match prospective customers with merchants. The merchant can improve their customer acquisition probability through a highly accurate filtering system. The physical proximity of the prospect with the merchant establishment coupled with the targeted offer creates a strong influence on the purchase decision of the prospect aiding in conversion. The merchant faces reduced risks, since the Customer Acquisition Fee is paid only after conversion is achieved. The Coupon tracking Component provides merchants with a transparent mechanism to measure effectiveness of their ads. The Rule Configuration Engine provides merchants to define fine-grained rules for ex restaurants may not give lower discount offers during peak hours but increase the discount offer during non-peak hours to drive traffic. The physical proximity of the customer and high probability of conversion leads merchants to provide higher discounts eventually resulting in more savings for the consumer. The Service Provider is the enabler of the platform. Payment Networks, FIs benefit, as the system serves as a monetization strategy for historical transaction or purchase data. Social Networking Platforms such as Facebook, Four-square also benefit as the system serves as a monetization strategy for user activity data. Entities such as Payment Networks, FIs increase Loyalty of their users by enabling the users to get more attractive offers.

BRIEF DESCRIPTION OF THE DRAWINGS

The present invention described herein will become apparent from the following detailed description considered in connection with the accompanying drawings, which disclose several embodiments of the invention. It should be understood, however, that the drawings are designed for the purpose of illustration and not as limits of the invention.

DETAILED DESCRIPTION

Figure 1:
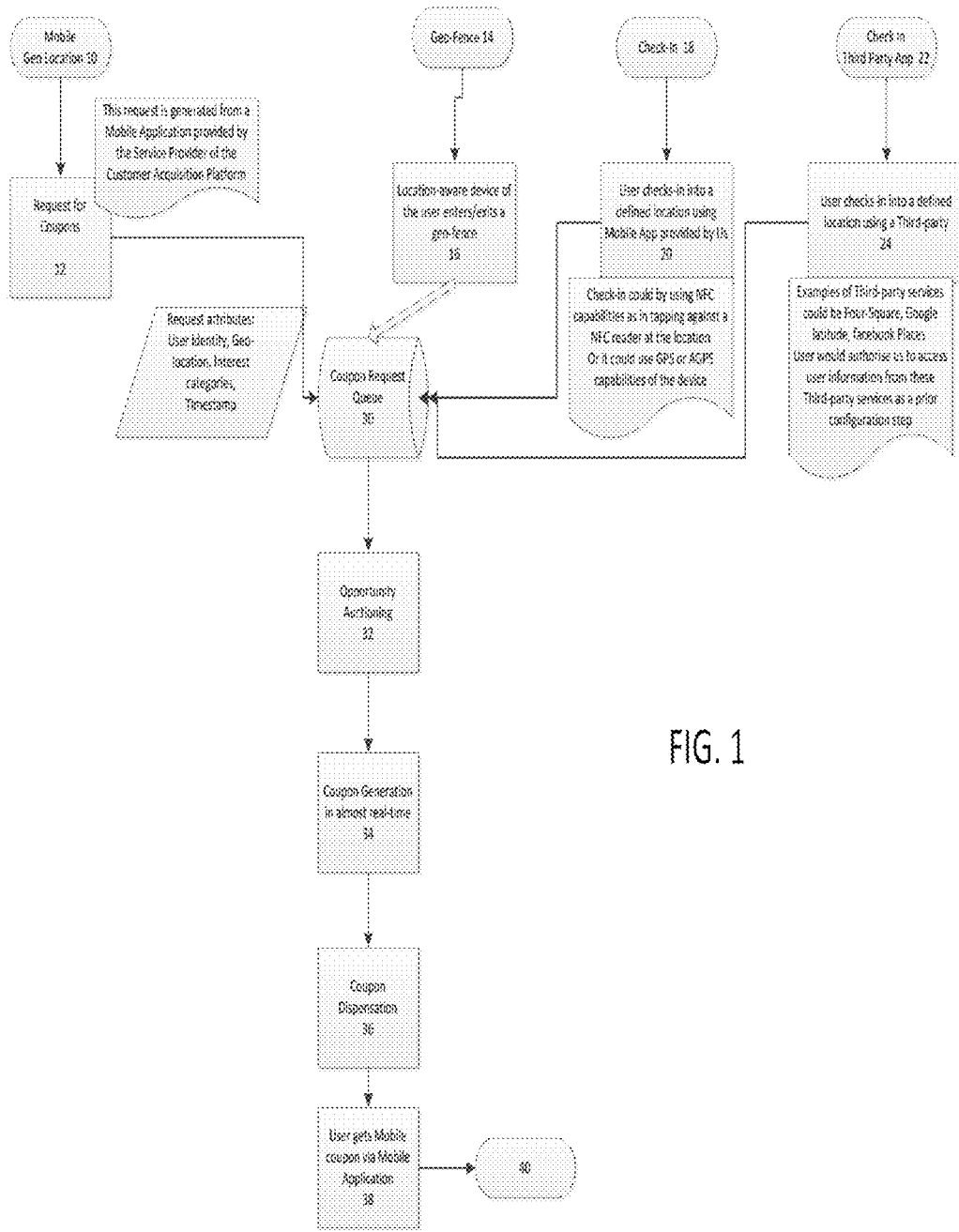
FIG. 1 shows an exemplary process to provide near real-time coupons for mobile devices.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

FIG. 1 shows an exemplary process to provide near real-time coupons for mobile devices. The system of FIG. 1 can detect the presence of a user in a particular area using various alternatives. For example, the system can detect location using a mobile phone's geo-location (10). The user can be detected through geo-fencing (14), a check-in with a dedicated mobile application provided by the platform (18), or a check-in using third party applications/services (22).

Turning now to FIG. 1, a user downloads a mobile application and runs the application to generate a request for coupons (12). The request includes the user's identity and may include the following: geo-location, interest categories, and/or a timestamp. The request is received by a coupon request queue (30). The queue also receives alternate forms of presence detection. For example, the system determines if a location-aware device enters/exits a geo-fence (16). Alternatively, the user checks into a defined location using a dedicated application (20). The check-in can be done with near-field-communication (NFC) capable device. In one case, the NFC device is tapped against an NFC reader to perform check-in for a location which may be a public place or inside a merchant establishment or a specific part of a Mall—this check-in acts as a trigger to the coupon request queue (30). Alternatively, the check-in can be done using third-party applications/Services (24), such as Four-Square, Google Latitude, or Facebook Places. The user would authorize the system to access information from third party services during application configuration, or during check-in, for example.

Each request is popped from the coupon request queue, and an opportunity auction is performed (32). The auction grants merchants local to the mobile device an opportunity to bid on the chance to display ads or coupons on the user's mobile device. The process then generates one or more coupons in near real-time (34). The coupon is dispensed to the mobile device (36). The user receives a notice of a coupon through the mobile application (38). One exemplary coupon is shown in FIG. 2E. After viewing the coupon, the user can order from the merchant on line or in person.

In one implementation, all services rendered by the platform are opt-in i.e. the user explicitly chooses to receive the offers. The system includes a Customer Acquisition Enabler Platform, which is a set of services which helps merchants to acquire new customers. A Platform Service Provider can be the entity which provides the Customer Acquisition Platform. A Prospect is a user of the platform who becomes the target of the Offer through various triggers, for example when user requests for Offers or when user opts to get offers when in a certain area such as a mall thru geo-fencing. During the process of generating a suitable offer, the user is considered to be a prospect. A Prospect Profile is created based on historical data for ex payment history, social networking behavior, coupon redemption data, among others.

Based on the data available to the system, it generates an Intent Prediction. In one implementation, the Intent Prediction is a real-time predictive analysis performed to create a list of service consumption/purchase possibilities which are collectively described as Predicted Intent. The Predictive Intent is specific to a Opportunity Auctioning/Coupon Generation cycle. The predictive process builds upon the Prospect Profile created from historical purchase/payment data, coupon redemption data and extrapolates it with information such as geo-location of user, interest categories, time-stamp, and other contextual information such as check-ins in the last one-hour, data from social networking platforms, among others.

In one embodiment, an Affinity score is generated. This is a numeric figure between 0 and 100 and refers to a numerical probability of the prospect visiting the merchant. The Potential revenue is the amount that the merchant may earn if the prospect becomes a customer.

A bid refers to an automated process whereby pre-defined rules are applied to affinity score and potential revenue to generate a prospect discount offer and an acquisition fee offer. A Prospect Discount Offer refers to a numerical figure that denotes a percentage. This is the discount offered to the prospect. The offer has a validity period. As the objective is prospect conversion and the offer is targeted, the validity period is in terms of hours rather than days.

An Acquisition Fee Offer is a numeric figure that denotes a percentage. This is the fee offered to the Platform service provider if the offer results in the prospect getting converted into a customer. In an example, if the merchant earns 100$ if the prospect gets converted into a customer, and if the acquisition fee is 25%, then the Platform service provider stands to get 25% of 100$, or 25$ as the acquisition fee.

A bid qualification is responsible for identifying the winning bid. The qualification considers a combination of Prospect Discount Offer and the Acquisition Fee Offer, the potential benefit to prospect and Platform Service Provider.

A winning bid is considered as an offer to the prospect. The system then creates a coupon to be sent to the prospect's mobile phone (mobile coupon) from the offer. A coupon is a digital representation of the merchant offer. The coupon dispensation process then sends the mobile coupon to the prospect.

Figure 2A:
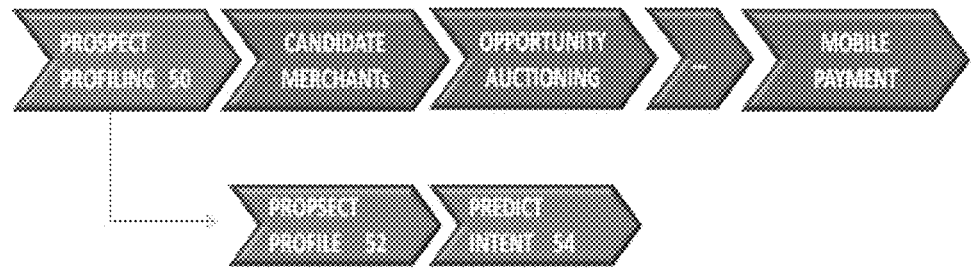
FIGS. 2A-2E show exemplary aspects of generating targeted offers to mobile users.
Figure 2B:
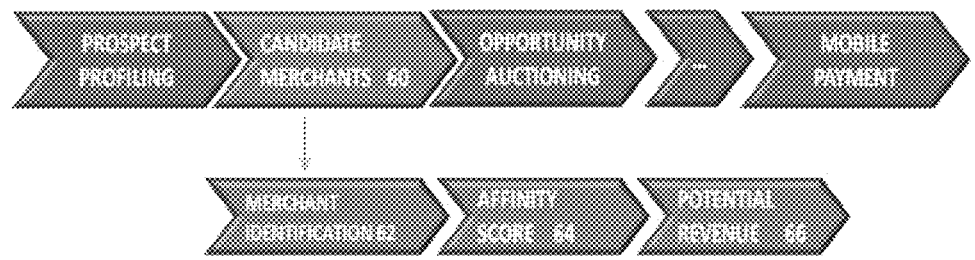
Figure 2C:
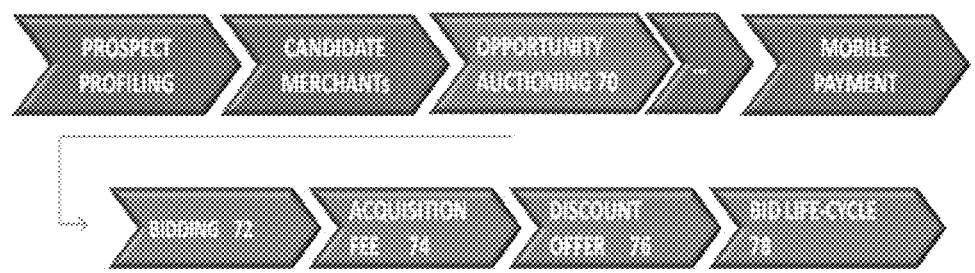

FIGS. 2A-2C show exemplary processes to enable advertisements on mobile devices. In FIG. 2A, a prospect profile is created based on transaction data and purchase history (50). A base profile already exists for each user. It is extrapolated with current location data, time etc to reach a predicted intent. The profile can be inferred by the user's habits such as preference for searching for a particular type of food or product, for example. Once analyzed, the prospect profile can be used to predict intent (54). For example, if the user is near a particular location around lunch time, the system can predict that the user will be hungry and will be looking for coupons related to food. The system can then run an auction for neighboring restaurants, and the winner can send its coupons or offers to the user.

In one example for constructing a Prospect Profile, the Platform detects based on the Prospect Profile that he/she regularly visits Chinese restaurants during a time-window such as early afternoon and in a certain location such as downtown Salt Lake City. The system identifies restaurant category as the category of merchants that may be of interest for the identified time and location. The process identifies candidate merchants for sending bid invitation that my include fast-food eateries such as KFC, Dominos, among others. The Platform can generate a coupon for the winning restaurant and the system relays the coupon to the mobile device or via notification to the web-based interface. The users can benefit from the coupons and the restaurants can gain a customer if the user decides to redeem the coupon.

In FIG. 2B, a process is disclosed for selecting candidate merchants (60). First, the merchant candidates are identified (62). Next, an affinity score is generated to see if the merchant's products or services match well with the user's interests (64), and potential revenues are determined (66).

The affinity score for a merchant indicates the probability of the prospect visiting the merchant. If the score is high then it means the prospect is more likely to visit the merchant. This affinity score will be used to further filter the merchants into two lists. Merchants with affinity score beyond a threshold value will become eligible for the Prospect Retention Program. They will be allowed to bid for offering loyalty or reward points to retain the prospect. Merchants with affinity score below a threshold value will become eligible for Opportunity Auctioning for Customer Acquisition.

In one example, the Identifying the merchants for Bid invitation can identify Merchants by location. Next, the merchants are filtered based on the Prospect Profile and the Predicted Intent. The process then determines the following for each candidate merchant: Affinity Score and Potential Revenue.

FIG. 2C shows an exemplary opportunity auctioning process (70). During this process, merchants bid for the right to show their advertisements to the mobile user (72). The bid contains amongst other things an Acquisition Fee offer for the platform service provider (74) and a Discount offer for the prospect (76). In one embodiment, the acquisition fee is the percentage of revenue that the merchant offers to share with the Platform Provider.

Figure 2D:
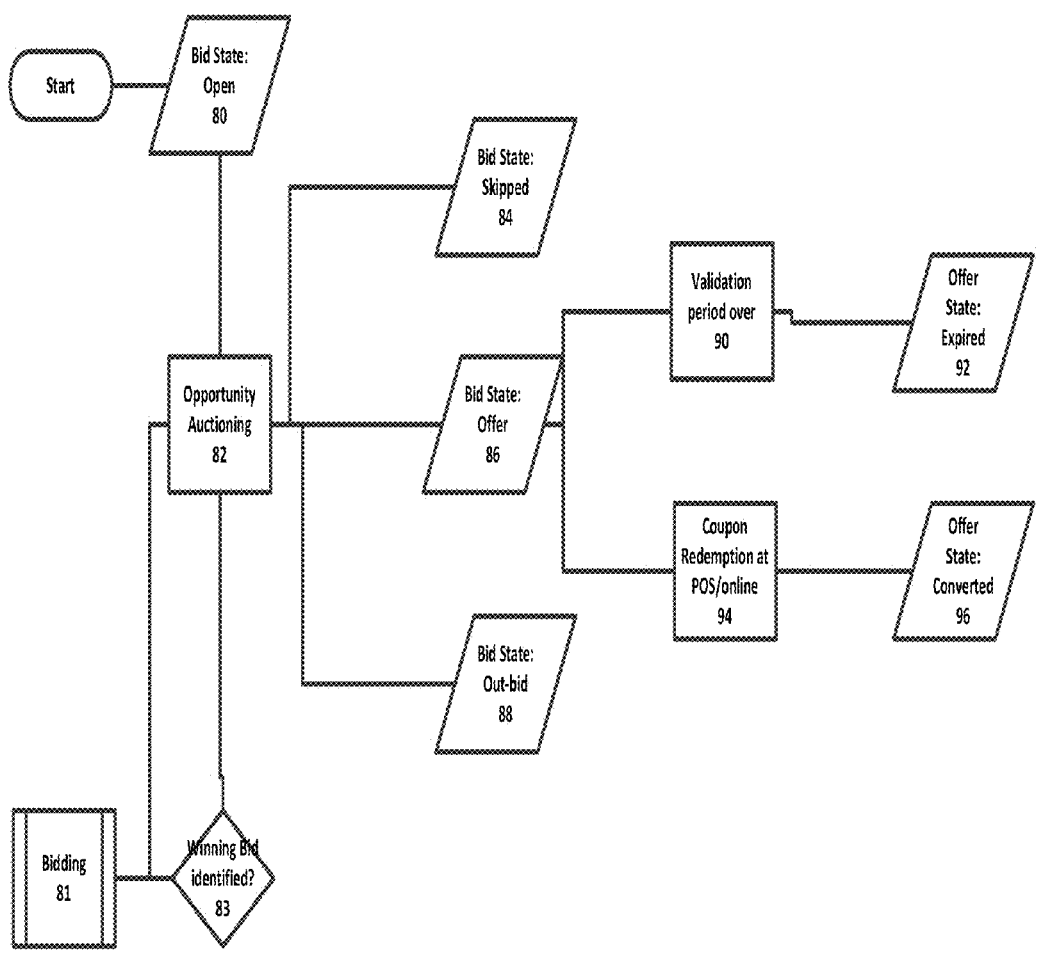
Figure 2E:
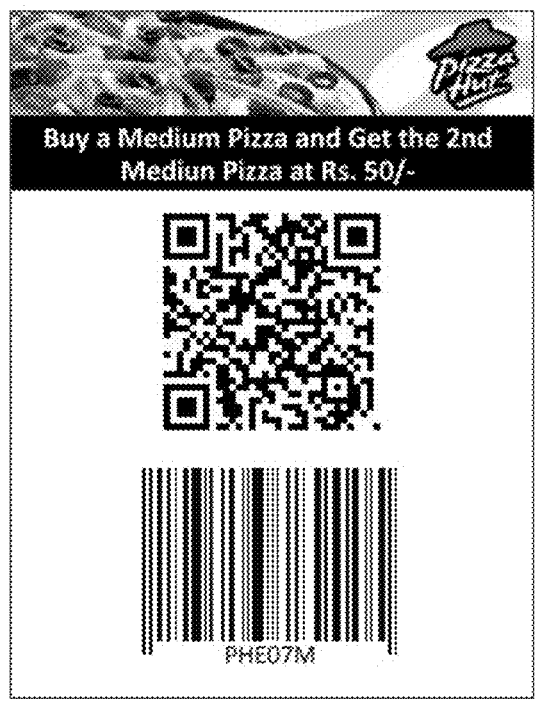

The Bids can be automatically performed at the back-end provided by the Platform Provider based on predefined Rules configurations. The bid-cycle is repeated (78), and the cycle is repeated until the winning bid is identified. The bidding is automated, iterative and in real-time. The bidders are assisted by rule-based, Automated Bidding Software Agents whose submissions are processed by a Bid Controller. Each Bid Output includes a Prospect Discount and an Acquisition Fee Offer as a percent of revenue from prospect conversion FIG. 2D shows a bid transition graph for merchants. The potential case is opened (80) for a customer acquisition auction (82). The merchant can skip the opportunity (84). The merchant bid can be outbid by other bids. If the merchant's bid is the winning bid, it becomes an offer and is presented to the prospect. As the offer has a validity period, if the prospect does not redeem the coupon within the validity period, the offer expires If the offer i.e. the coupon is redeemed then the prospect is considered to be converted into customer. The coupon is redeemed if the prospect actually gets converted into a customer.

Figure 3:
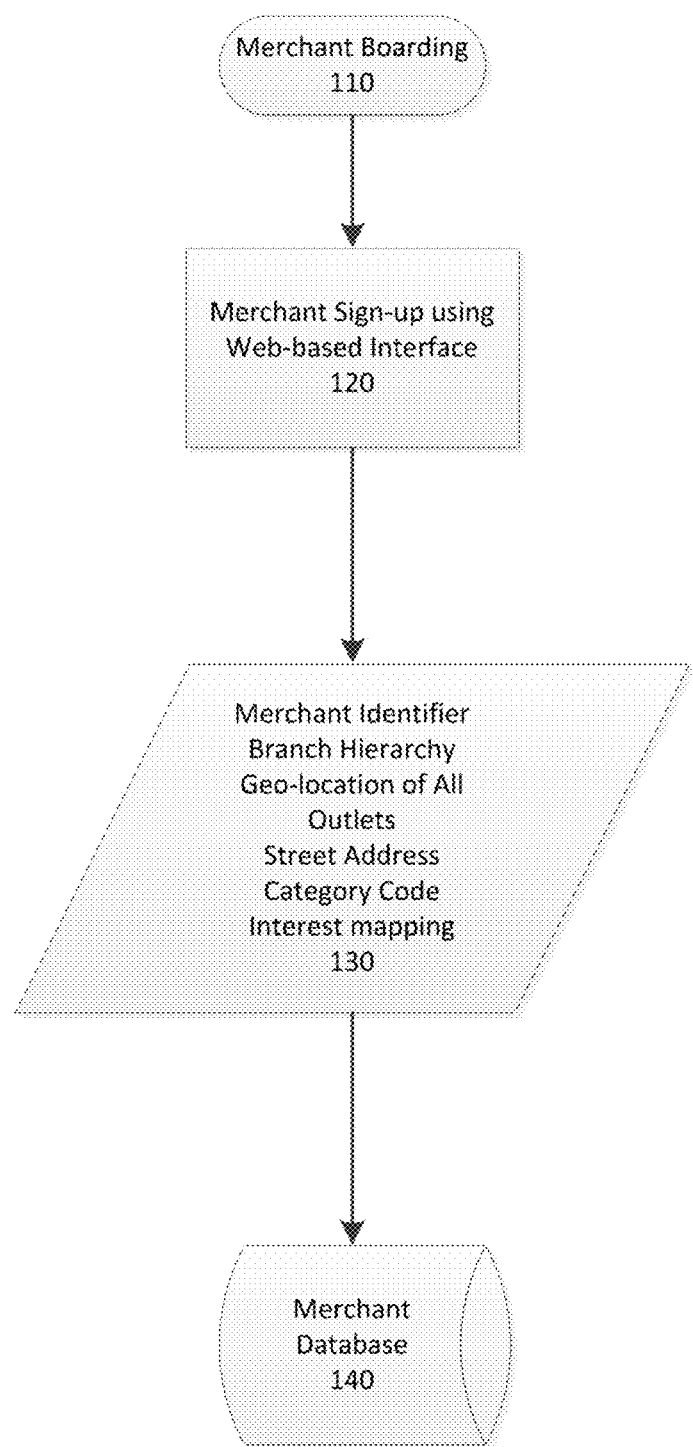
FIG. 3 shows an exemplary merchant boarding process.

An automated bidding process creates bids for each candidate merchant using predefined rules. The Bid Qualification algorithm considers a combination of Prospect Discount Offer and Acquisition Fee Offer to identify the winning bid FIG. 3 shows an exemplary merchant boarding process 110. In this process, the merchant registers with the system using a web-based interface (120). The system in turn stores information in a database. One implementation stores data such as merchant identifier, branch hierarchy, location of outlets, category code, and interests (130) are stored in the database (140).

Figure 4:
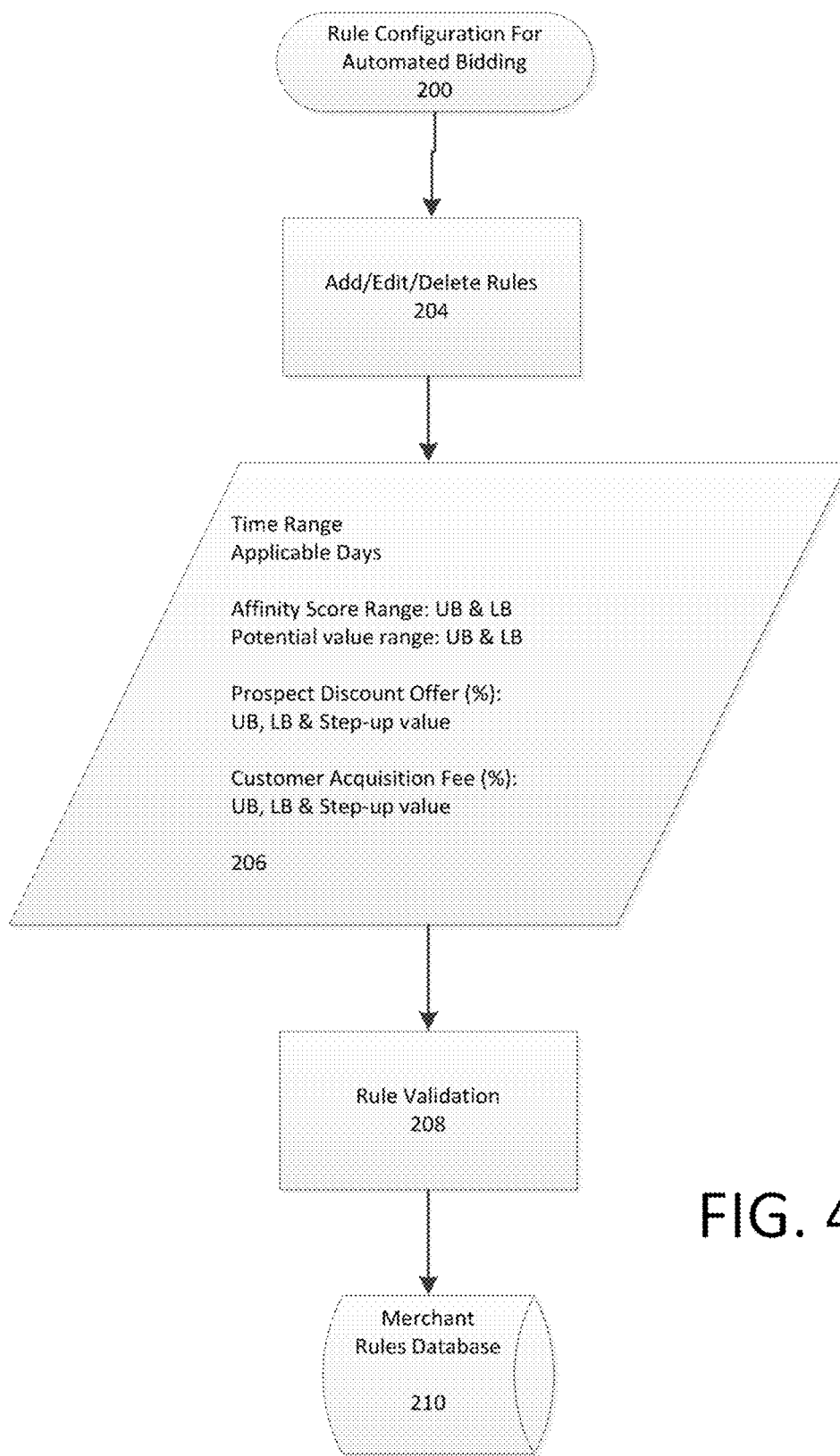
FIG. 4 shows an exemplary process for rule-based configuration in automated bidding.

FIG. 4 shows an exemplary process for rule-based configuration in automated bidding (200). The user can add/edit/delete rules relating to automated bidding (204). For example, the rules can specify the time range (days or hours in one embodiment), a prospect discount offer percentage, and customer acquisition fee percentage (206). The rule is validated by validation engine (208). The rule is then stored in the merchant rules database (210).

Figure 5:
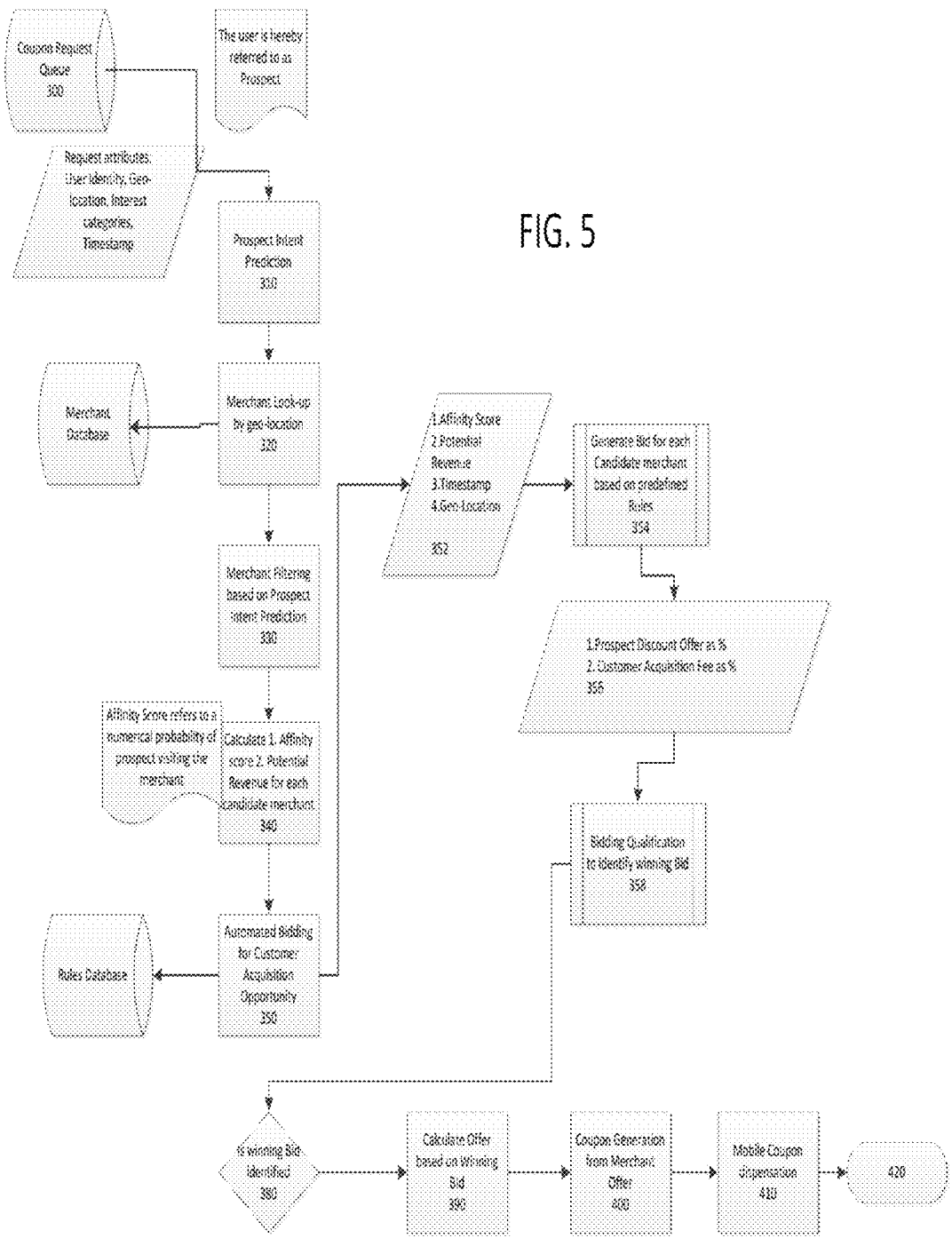
FIG. 5 shows an exemplary process for handling a prospect on a mobile device.

FIG. 5 shows an exemplary process for handling a prospect on a mobile device. In FIG. 5, a user or customer is referred to as a prospect. The process retrieves data from the coupon request queue information such as user identity, geo-location, interest categories, and timestamp information, among others. The process generates a prospect intent prediction (310). Potential merchants matching the intent prediction are located by looking up a database on geo-locations (320). Potential merchants are filtered out based on the prospect intent prediction (330). Next, the process determines an affinity score and potential revenue for each candidate merchant (340). The affinity score refers to a numerical probability of the prospect in visiting the merchant.

If requested, the system can perform automated bidding for a customer acquisition opportunity in accordance with a rules database previously set up by the merchant (350). The system can identify if the customer matches predetermined affinity score, potential revenue, timestamp, and geo-location values, for example (352). The system can automatically generate bids for each candidate merchant based on the predefined rules (354). For example, the rules may specify a predetermined prospect discount percentage and a customer acquisition fee percentage (356). The winning bid is the one which has the best combination of Acquisition Fee Offer for the Platform Service Provider and the Prospect Discount Offer. If the first round of automated bidding does not yield a clear winner, the bidding iteration is repeated until a clear winner is identified. The system creates the offer based on the winning bid (390). A coupon is generated based on the merchant offer (400). The coupon generation process involves adding the Prospect Discount Offer to a predefined graphical element which is a digital representation of the Merchant Offer and the coupon is dispensed by wireless transmission to the mobile device or as a response to http request from a browser client (410). The process then exits.

Figure 6A:
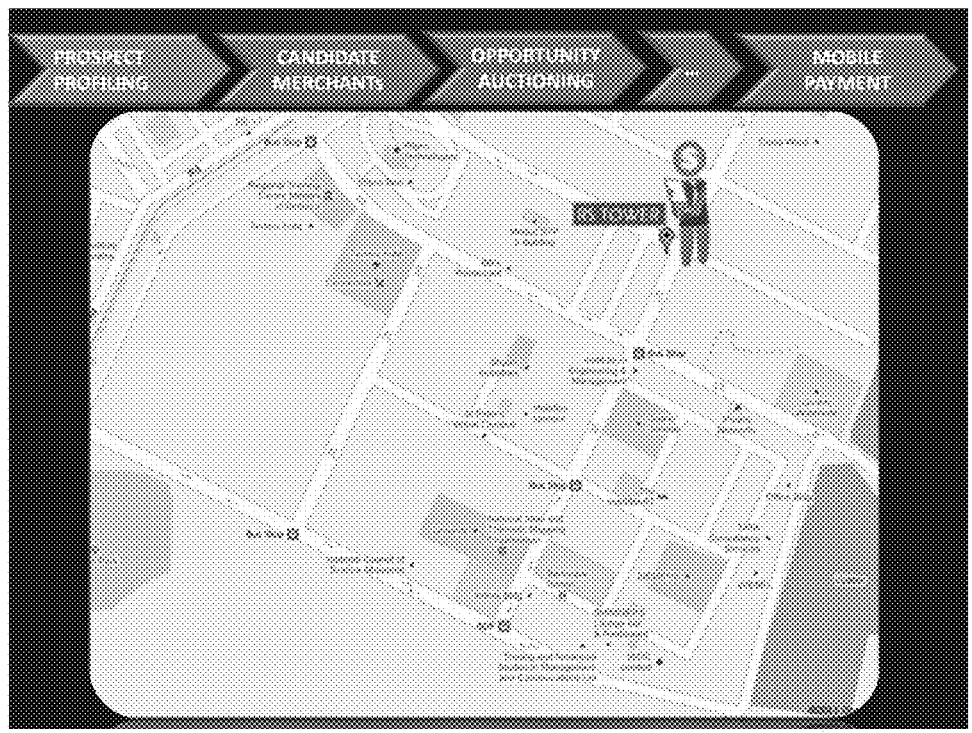
FIGS. 6A-6F show an example of a customer acquisition process using the system of FIG. 1.
Figure 6B:
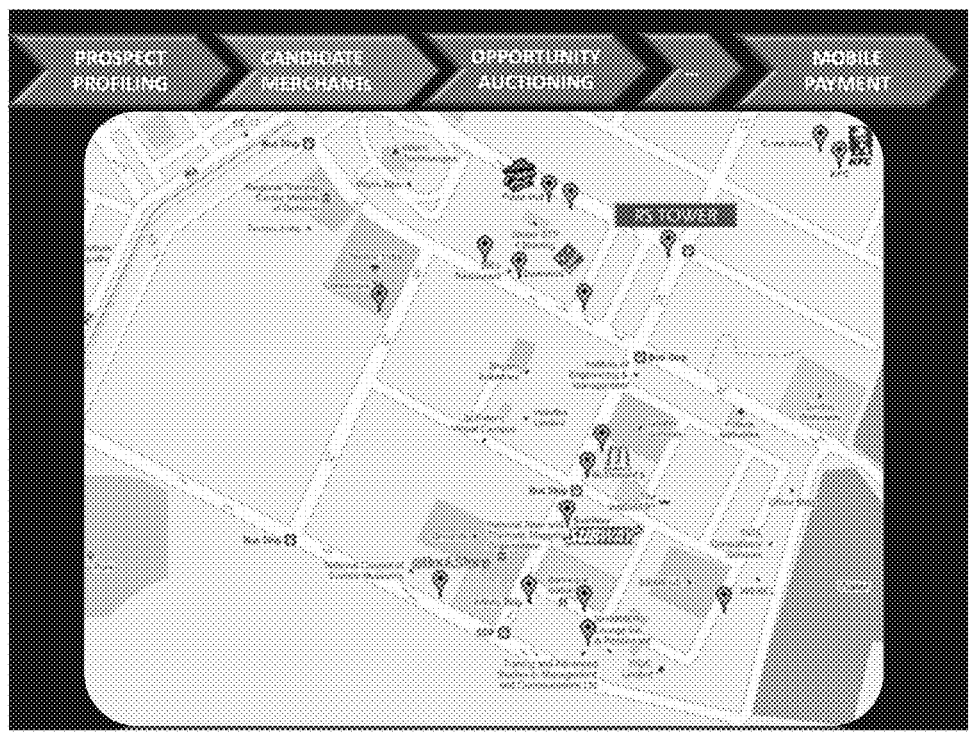
Figure 6C:
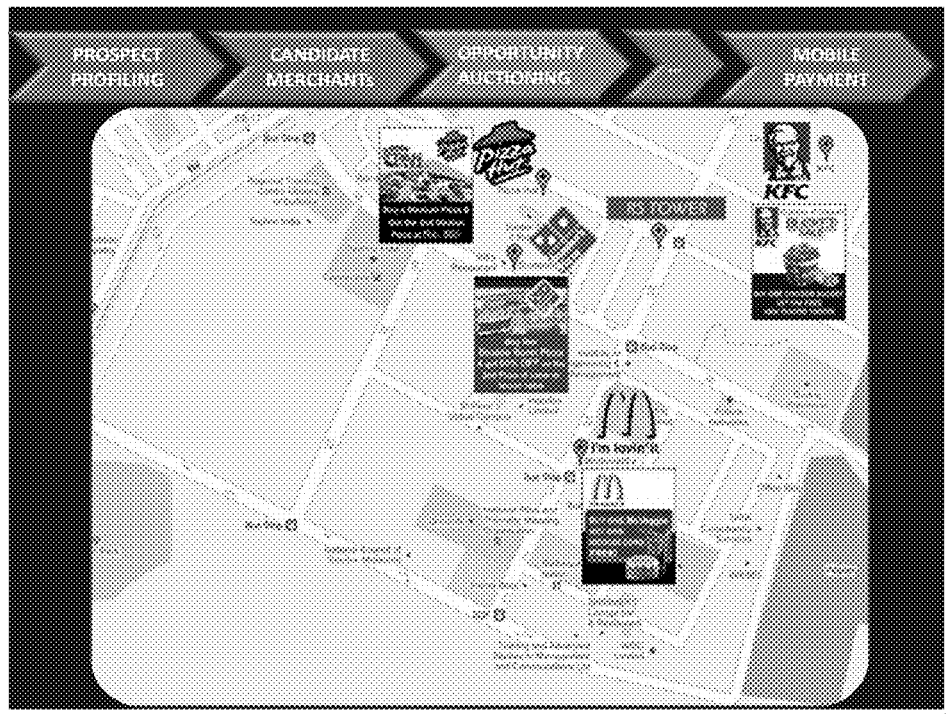
Figure 6D:
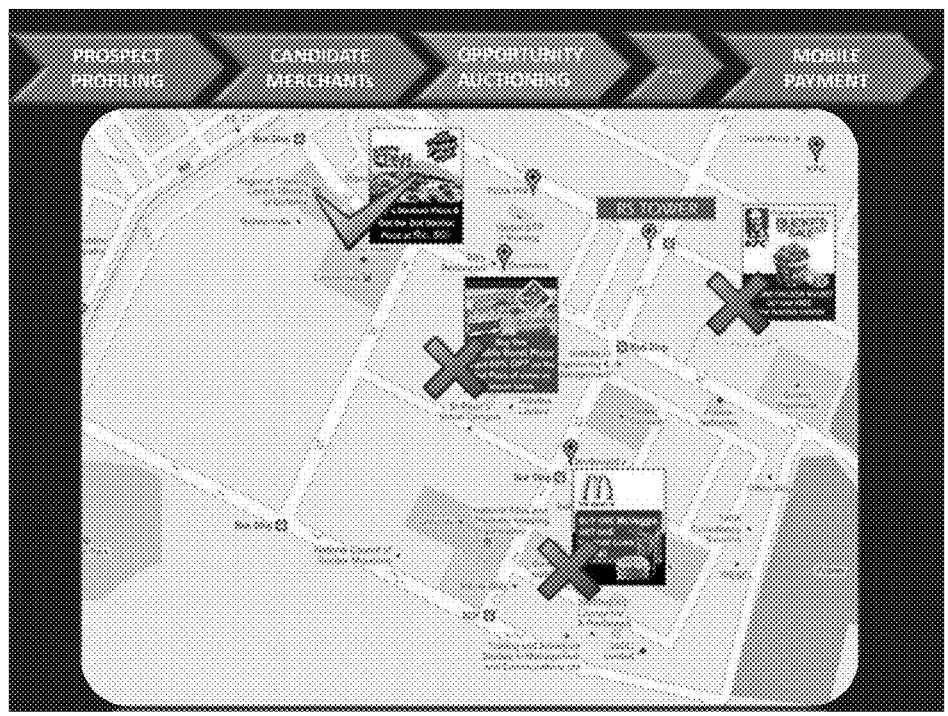
Figure 6E:
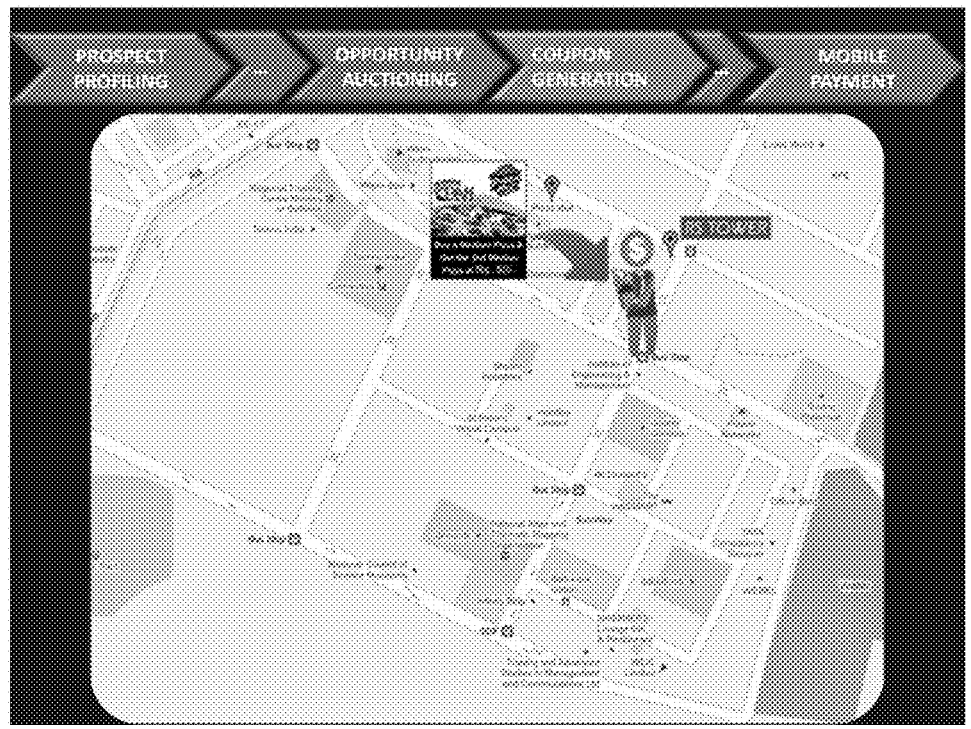
Figure 6F:
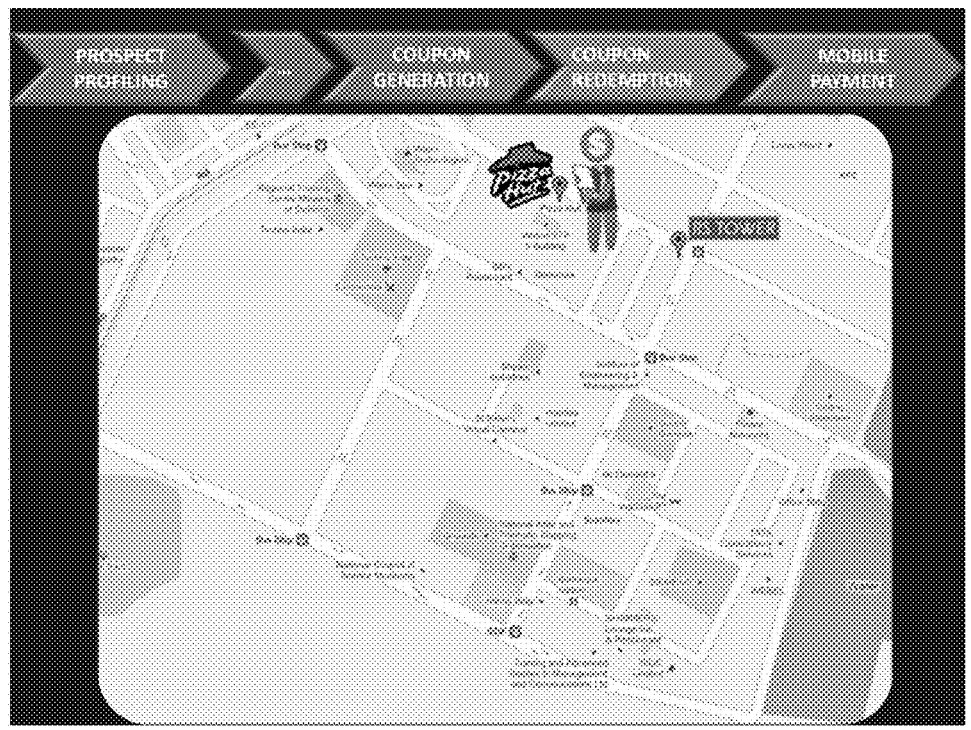

FIG. 6A shows an exemplary prospect arriving at a district. In this example, it is almost noon and the prospect is hungry. The system determines candidate merchants to receive bidding offers in FIG. 6B. In FIG. 6C, the ad opportunity is auctioned, and bids are generated for candidate merchants based on pre-defined rules system. A winner is determined in FIG. 6D, in this case a local PizzaHut restaurant. A coupon is generated in near real-time and sent to the prospect in FIG. 6E. In FIG. 6F, the prospect uses the coupon and buys from PizzaHut.

As illustrated in FIGS. 6A-6F, a business model for various stake-holders in the eco-system includes at least the following:

1. Platform service provider gets acquisition fee when prospects are converted into customers. Acquisition fee is maximized by opportunity auctioning 2. Monetization strategy for payment history data, social networking data, among others.

3. Merchants can acquire new customer via targeted offers—the merchants pay acquisition fee only if prospect is converted into a customer.

4. End-Users of the platform get higher discounts and therefore more savings.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a mobile device preferably includes a processor, random access memory (RAM), a program memory (preferably a writable read-only memory (ROM) such as a flash ROM) and an input/output (I/O) controller coupled by a CPU bus. The computer may optionally include a flash drive controller which is coupled to a hard disk and CPU bus. Flash memory may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Executable instructions are storable in the memory and executable by the processor 202 to perform various functions according to embodiments of the present disclosure. Memory can additionally store various information, e.g., information relating to particular, available, advertising content as well as the advertising content itself. This advertising content can include a brand name such as a name of a particular product, service, and/or company, as well as associated content, such as games, short-form video, animation, or consumer marketing material. For example, as will be described in more detail below, the memory can store information that represents a number of advertising channels that may be provided to the display. The memory can store various audio and visual content associated with the number of advertising channels, e.g., the advertisement content itself, that may be provided to the display. The memory of the mobile phone can include an operating system such as J2ME stored in a read only memory (ROM). The memory can also include random access memory (RAM), flash memory, etc. Thus, various memory on the mobile phone is available to store program instructions, routines, and applications.

In one embodiment, the device can be a phone such as the iPhone. The iPhone has a 3G cellular transceiver devices, ROM and RAM. For display, the iPhone has a 3.5 inches (8.9 cm) liquid crystal display (320×480 pixels) HVGA, acting as a touch screen that has been created for the use with one finger or multiple fingers. In another embodiment, smart phones such as Android phones and devices running OS from Microsoft, RIM or Palm can serve as the mobile device.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Appendix-Use Case

Glossary of Terms
Customer Acquisition Enabler Platform:
A set of services which helps merchants to acquire new customers and retain existing
The business model for various stake-holders in the eco-system:
1. Platform service provider gets acquisition fee when prospects are converted into customers. Acquisition fee is maximized by opportunity auctioning
2. Monetization strategy for payment history data, Social networking data etc
3. Merchants can acquire new customer via targeted offers—they pay acquisition fee only if prospect is converted into customer
4. End-Users of the platform get higher discounts and therefore more savings
Platform Service Provider:
This is the entity which provides the Customer Acquisition Platform.
Prospect:
A user of the platform becomes the target of the Offer through various triggers ex when user requests for Offers or when user opts to get offers when in a certain area like a mall thru geo-fencing
During the process of generating a suitable offer, the user is considered to be a prospect.
Prospect Profile:
This profile is created based on historical data for ex payment history, social networking behaviour, coupon redemption data etc
Intent Prediction
A real-time predictive analysis is performed to create a list of service consumption/purchase possibilities which are collectively described as Predicted Intent.
This is specific to a Opportunity Auctioning/Coupon Generation cycle.
The Predictive process builds upon the Prospect Profile created from historical purchase/payment data, coupon redemption data
and extrapolates it with information like geo-location of user, interest categories, time-stamp
and other contextual information like check-ins in the last one-hour, data from social networking platforms, etc
Affinity score:
This is a numeric figure between 0 and 100.
It refers to a numerical probability of the prospect visiting the merchant.
Potential revenue:
Amount that the merchant may earn if the prospect becomes a customer
Bid
Bid refers to an automated process whereby pre-defined rules are applied to affinity score and potential revenue to generate a prospect discount offer and an acquisition fee offer.

Prospect Discount Offer:
A numerical figure that denotes a percentage. This is the discount offered to the prospect.
The offer has a validity period. As the objective is prospect conversion and the offer is targeted, the validity period is in terms of hours rather than days.
Acquisition Fee Offer:
A numeric figure that denotes a percentage. This is the fee offered to the Platform service provider if the offer results in the prospect getting converted into a customer.
Let us say that the merchant earns 100$ if the prospect gets converted into a customer.
If the acquisition fee is 25%, then the Platform service provider stands to get 25% of 100$ i.e. 25$ as the acquisition fee.
Bid qualification:
This process is responsible for identifying the winning bid.
It considers a combination of Prospect Discount Offer and the Acquistion Fee Offer i.e. potential benefit to prospect and Platform Service Provider.
Offer creation
The prospect discount offer of A winning bid is considered as an offer to the prospect.
Coupon generation
This is the process of creating a mobile coupon from the offer. The information is stored in a database.
Coupon
A coupon is a digital representation of the merchant offer.
Coupon dispensation
This is the process of sending the mobile coupon to the prospect.

BACKGROUND

The Customer Acquisition Enabler Platform is named Get.More
Service Provider refers to the service provider of this platform
User refers to an individual registered as an user of Get.More
Merchant refers to business entities who are boarded to the Get.More platform
Get.More Mobile App refers to the mobile application for users (Android, Iphone etc) provided via the Application repository of the Mobile OS eco-system(Apple AppStore, Android Market etc)
Get.More Web refers to the User view of the Get.More hosted Web interface accessible via internet.
Get.More Dashboard refers to the Merchant view of the Get.More Web hosted Web interface accessible via internet.
Get.More Administration console refers to the Administrator view of the Get.More hosted Web interface accessible via internet.

Use-cases

1. Triggers for Offer generation
1.1 Trigger for Offer generation: Mobile App Request
User requests(i.e Pulls) for Offers using Get.More Mobile App. at 1 PM from Embarcadero Center, SFO
This event notification acts as a trigger for Customer Acquisition Example#2 below.
1.2. Trigger for Offer generation: Geo-fencing
The user has opted in to receive offers in Push mode
A geo-fence is established in and around Embarcadero Center, SFO Get.More Mobile App is running on the user's mobile either in the foreground or in the background or as a service The user's location-aware device enters the geo-location approaches, This triggers an event notification to Get.More server This event notification acts as a trigger for Customer Acquisition Example#2 below.

1.3. Trigger for Offer generation: NFC-based check-in

The user has opted in to receive offers in Push mode

Get.More branded NFC reader in the form of a placard or banner or kiosk is available at various strategic points in and around Embarcadero Center, SFO Get.More Mobile App is running on the user's mobile either in the foreground or in the background or as a service The user checks-in at the mall by tapping his NFC-enabled device against the NFC-enabled placard/badge/banner This triggers an event notification to Get.More server This event notification acts as a trigger for Customer Acquisition Example#2 below.

1.4. Trigger for Offer generation: Check-in via Third-party Social Location-sharing services The user has opted in to receive offers in Push mode The user has allowed Get.More Platform access to Third-party Social location-sharing services like Four-Sqaure, Facebook Places, Google Latitude etc The user checks-into a location using a Third-party Social location-sharing service Get.More accesses this check-in event from the Third-party Social location-sharing service This event notification acts as a trigger for Customer Acquisition Example#2 below.

1.5. Trigger for Offer generation: Pull request via Get.More Web

User requests(i.e Pulls) for Offers using Get.More Web at 7 PM from Embarcadero Center, SFO on Saturday This event notification acts as a trigger for Customer Acquisition Example#2 below.

2. Customer Acquisition Use-case

Prospect Profile for user indicates user has a history of patronizing restaurants serving Italian food during lunch period Predictive Intent for current request based on location, time and context suggest user may be planning to visit his favorite Restaurant Based on this predicted intent, the system identifies a list of restaurants/eateries in the immediate vicinity that this user has never patronized or is unlikely to patronize An automated opportunity auctioning happens, where Pizza Hut's bid qualifies as the winner Pizza but bid outbids other bids as it has a combination of highest discount offer of 25% to the user and the highest acquisition fee offer of 10% to the platform service provider.

A mobile coupon representing the discount offer from Pizza Hut is sent to the user.

This coupon is valid for 30 minutes only

User's purchase decision is influenced and he decides to visit Pizza but to redeem his coupon.

Pizza Hut acquires a new customer

Acquisition fee of 10% is earned by the Service Provider for prospect conversion Consumer gets 25% discount.

3. Customer retention & Customer acquisition side-by-side

In the above example,

Assuming the user's favorite restaurant is boarded on to Get.More

The Customer Retention Module of Get.More would generate an Offer for winning Loyalty points on behalf of the user's favorite Restaurant Therefore the user receives an offer to win x loyalty points along with a mobile coupon for Discount Offer from Pizza Hut Hence the system generates opportunities for both acquisition and retention.

4. Up-sell Use case

The user has opted in to receive offers in Push mode

Get.More Mobile App is running on the user's mobile either in the foreground or in the background or as a service User visits Macy's Department stores Based on indoor location-tracking, the system is able to detect that user is in the Beauty products section Or User taps his NFC-enabled phone against NFC reader in the form of a banner/placard/badge This triggers an event notification to Get.More server This event notification acts as a trigger for Customer Up-sell Module Customer Up-sell module uses pre-configured rules to generate a coupon for the user which could be redeemed at the Jewelry section ONLY with validity of next 30 mins The system thus provides powerful up-sell opportunities.

5. Cross-sell

The user has opted in to receive offers in Push mode

Get.More Mobile App is running on the user's mobile either in the foreground or in the background or as a service The user has allowed Get.More Platform access to Third-party Social Networking services and/or his search history The user visits an electronics goods store is looking at tablets.

The user scans the bar-code of an Ipad device to get more information using Get.More Mobile App Or The user searches for an Ipad via a search engine Or User shares his IPad purchase plan or asks opinion of Ipad via social networking platform This triggers an event notification to Get.More server This event notification acts as a trigger for Customer Cross-sell Module Customer Cross-sell module uses pre-configured rules to generate a package deal for load along with recommended accessories with validity of next 30 mins The system thus provides powerful cross-sell opportunities.

6. Conversion of lost opportunity

The user has opted in to receive offers in Push mode

Get.More Mobile App is running on the user's mobile either in the foreground or in the background or as a service A prospective customer is exiting a merchant location after spending 30 minutes browsing through merchandise.

This triggers an event notification to Get.More server

This event notification acts as a trigger for Customer Retention Module

Customer Retention module uses pre-configured rules to generate an instant offer on behalf of merchant The system thus provides a pre-emptive opportunity to convert lost prospects before they exit the store.

7. Group buying via viral networking

The Merchant could provide Offers that come with riders like "applicable for a group of 5"

This could bring Viral marketing into the play

The system thus creates opportunities to maximize revenue from a single customer.

What is claimed is:

1. A method to acquire customers for merchants using a mobile application or a browser interface of a prospective buyer, comprising:
    capturing attributes from the prospective buyer;
    creating a prospect profile for a user based on data including purchase history, social networking data, location data from location-sharing services, and search history;
    performing predictive analysis to extrapolate the prospect profile to include geo-location and timing associated with the geo-location;
    creating an intent prediction for the prospect profile from historical purchase or payment data, coupon redemption data, geo-location of the user, interest categories, timestamp, contextual information including check-ins in the last one-hour, and data from social networking platforms;
    precisely targeting the prospective buyer by using the prospect profile and intent prediction;
    generating an offer by a processor with an action selected from the group consisting of: a mobile application request, a geo-fence, a near field communication (NFC) check-in, a location-sharing service check-in, and a user pull request;
    locating candidate merchants and filtering candidate merchants using the intent prediction for the prospective buyer;
    initiating opportunity auctioning within the candidate merchants for an opportunity to send an offer to the prospect;
    applying rules to specify a time range, a prospect discount offer percentage, and customer acquisition fee percentage;
    validating the rules by validation engine;
    identifying a winning merchant with a winning bid having a predetermined combination of an Acquisition Fee Offer for a Platform Service Provider and a Prospect Discount Offer;
    generating a coupon with the Prospect Discount Offer using the processor for the user on behalf of the winning merchant;
    dispensing an advertisement or coupon to the mobile application or the browser interface;
    providing monetary benefit to the buyer with the coupon;
    acquiring new customers for the winning merchant with the Acquisition Fee Offer; and sharing revenue with the winning merchant.

2. The method of claim 1, comprising determining an affinity score indicative of a probability that the prospective buyer will visit a merchant.

3. The method of claim 1, comprising storing merchant identifier, branch location, geo-location, and category code.

4. The method of claim 1, comprising automatically bidding on behalf of merchants using one or more predefined rules.

5. The method of claim 4, wherein the rules specify one or more of: time range, affinity score range, potential revenue range, prospect discount offer-upper bound, lower bound and step up value, customer acquisition fee offer-upper bound, lower bound and step up value.

6. The method of claim 4, comprising validating the rules.

7. The method of claim 1, comprising bidding in real-time on behalf of a merchant.

8. The method of claim 1, comprising generating a coupon for the prospective buyer.

9. The method of claim 8, comprising dispensing the coupon.

10. The method of claim 1, comprising generating a bar-coded advertisement or a bar-coded coupon for the prospective buyer.

11. An advertisement system to acquire customers with a mobile device or a browser interface, comprising:
    a mobile device, including computer readable code and
    a server coupled to the mobile device, the server including computer readable code for
    capturing attributes from a prospective buyer;
    creating a prospect profile for a user based on data including purchase history, social networking data, location data from location-sharing services, and search history;
    performing predictive analysis to extrapolate the prospect profile to include geo-location and timing associated with the geo-location;
    creating an intent prediction for the prospect profile from historical purchase or payment data, coupon redemption data, geo-location of the user, interest categories, timestamp, contextual information including check-ins in the last one-hour, and data from social networking platforms;
    precisely targeting the prospective buyer by using the prospect profile and intent prediction;
    generating an offer by a processor with an action selected from the group consisting of: a mobile application request, a geo-fence, a near field communication (NFC) check-in, a location-sharing service check-in, and a user pull request;
    locating candidate merchants and filtering candidate merchants using the intent prediction for the prospective buyer;
    initiating opportunity auctioning within the candidate merchants for an opportunity to send an offer to the prospect;
    applying rules to specify a time range, a prospect discount offer percentage, and customer acquisition fee percentage;
    validating the rules by validation engine;
    identifying a winning merchant with a winning bid having a predetermined combination of an Acquisition Fee Offer for a Platform Service Provider and a Prospect Discount Offer;
    generating a coupon with the Prospect Discount Offer using the processor for the user on behalf of the winning merchant;
    dispensing an advertisement or coupon to the mobile application or the browser interface;
    providing monetary benefit to the buyer with the coupon;
    acquiring new customers for the winning merchant with the Acquisition Fee Offer; and
    sharing revenue with the winning merchant.

12. The system of claim 11, comprising computer readable code for determining an affinity score indicative of a probability that the prospective buyer will visit a merchant.

13. The system of claim 11, comprising computer readable code for storing merchant identifier, branch location, geo-location, and category code.

14. The system of claim 11, comprising computer readable code for automatically bidding on behalf of merchants using one or more predefined rules.

15. The system of claim 14, wherein the rules specify one or more of: time range, affinity score range, potential revenue range, prospect discount range, customer acquisition cost range.

16. The system of claim 14, comprising computer readable code for automatically validating the rules.

17. The system of claim 11, comprising computer readable code for bidding in real-time on behalf of a merchant.

18. The system of claim 11, comprising computer readable code for generating a bar coded coupon for the prospective buyer.

19. The system of claim 18, comprising computer readable code for dispensing the coupon.

20. An advertisement system to acquire customers with a mobile device or a browser interface, comprising:
- mobile device, including computer readable code for capturing attributes from a prospective buyer; and
- a server coupled to the mobile device, the server including:
  - computer readable code for creating a prospect profile using customer data from a plurality of sources, for generating an intent prediction for the prospect profile from historical purchase or payment data, coupon redemption data, geo-location of a user, interest categories, time-stamp, contextual information including check-ins in the last one-hour, and data from social networking platforms, for triggering an offer generation from an action selected from the group consisting of: a mobile application request, a geo-fence, a near field communication (NFC) check-in, a location-sharing service check-in, a user pull request; for locating nearby merchants and filtering merchants with the intent prediction for the prospective buyer, for initiating opportunity auction within merchants for sending offer to prospective buyer, for identifying a winning merchant, for generating coupon for the offer in the database and for dispensing the coupon for the winning merchant to the mobile device or the browser-interface;
  - computer readable code for performing automated bidding for a customer acquisition opportunity in accordance with a rules database set up by a merchant, wherein the code identifies if a customer matches a predetermined affinity score, potential revenue, timestamp, and geo-location values;
  - computer readable code for automatically generate bids for each candidate merchant based on predefined rules, wherein a winning bid has a predetermined combination of an Acquisition Fee Offer for a Platform Service Provider and a Prospect Discount Offer;
  - computer readable code for creating a coupon generated from the merchant including adding the Prospect Discount Offer to a predefined graphical element which is a digital representation of the Merchant Offer; and
  - computer readable code for dispensing the coupon.

* * * * *